(12) United States Patent
Citro et al.

(10) Patent No.: US 11,754,057 B2
(45) Date of Patent: Sep. 12, 2023

(54) BALANCED PRESSURE TWO-ZONE FLUIDIC VALVE WITH SHAPE MEMORY ALLOY CONTROL ELEMENT

(71) Applicant: SAES GETTERS S.P.A., Lainate (IT)

(72) Inventors: Marco Citro, Varese (IT); Stefano Alacqua, Como County (IT); Stefano Franceschinis, Milan (IT)

(73) Assignee: SAES GETTERS S.P.A., Lainate MI (IT)

( * ) Notice: Subject to any disclaimer, the term of this patent is extended or adjusted under 35 U.S.C. 154(b) by 0 days.

(21) Appl. No.: 17/615,245

(22) PCT Filed: Jul. 21, 2020

(86) PCT No.: PCT/EP2020/070559
§ 371 (c)(1),
(2) Date: Nov. 30, 2021

(87) PCT Pub. No.: WO2021/013836
PCT Pub. Date: Jan. 28, 2021

(65) Prior Publication Data
US 2022/0205434 A1 Jun. 30, 2022

(30) Foreign Application Priority Data
Jul. 22, 2019 (IT) .................. 102019000012552

(51) Int. Cl.
*F03G 7/06* (2006.01)
*F16K 37/00* (2006.01)
(Continued)

(52) U.S. Cl.
CPC ........ *F03G 7/0614* (2021.08); *F16K 37/0041* (2013.01); *F05C 2251/08* (2013.01); *F16K 31/002* (2013.01); *F16K 31/126* (2013.01)

(58) Field of Classification Search
CPC .. F03G 7/0614; F16K 37/0041; F16K 31/002; F16K 31/126; F16K 99/0038; F05C 2251/08
(Continued)

(56) References Cited

U.S. PATENT DOCUMENTS 3,214,134 A * 10/1965 Noakes ................. F16K 39/022
251/282
3,613,732 A * 10/1971 Willson ................. F16K 31/025
60/527
(Continued)

FOREIGN PATENT DOCUMENTS

DE 102006052296 A1 3/2008
EP 2239486 A1 10/2010

OTHER PUBLICATIONS

International Search Report and Written Opinion dated Aug. 31, 2020 in PCT/EP2020/070559, 13 pages.

*Primary Examiner* — David Colon-Morales
*Assistant Examiner* — Andrew J Rost
(74) *Attorney, Agent, or Firm* — Element IP, PLC

(57) ABSTRACT

A fluidic valve having a first zone and a second zone separated by an aperture that is sealed by a deformable element, where: in the first zone, there is a shape memory alloy (SMA) wire secured to a stationary surface and the SMA acts on a first surface of the deformable element either directly or through a piston; in the second zone, there are at least two ports and a plunger connected to a second surface of the deformable element, opposite to the first surface, and suitable to close one of the ports; and there is a bypass channel that permanently connects the first zone to the second zone through a first end aperture positioned in the first zone and a second end aperture positioned in the second zone.

12 Claims, 4 Drawing Sheets

Figure 1:
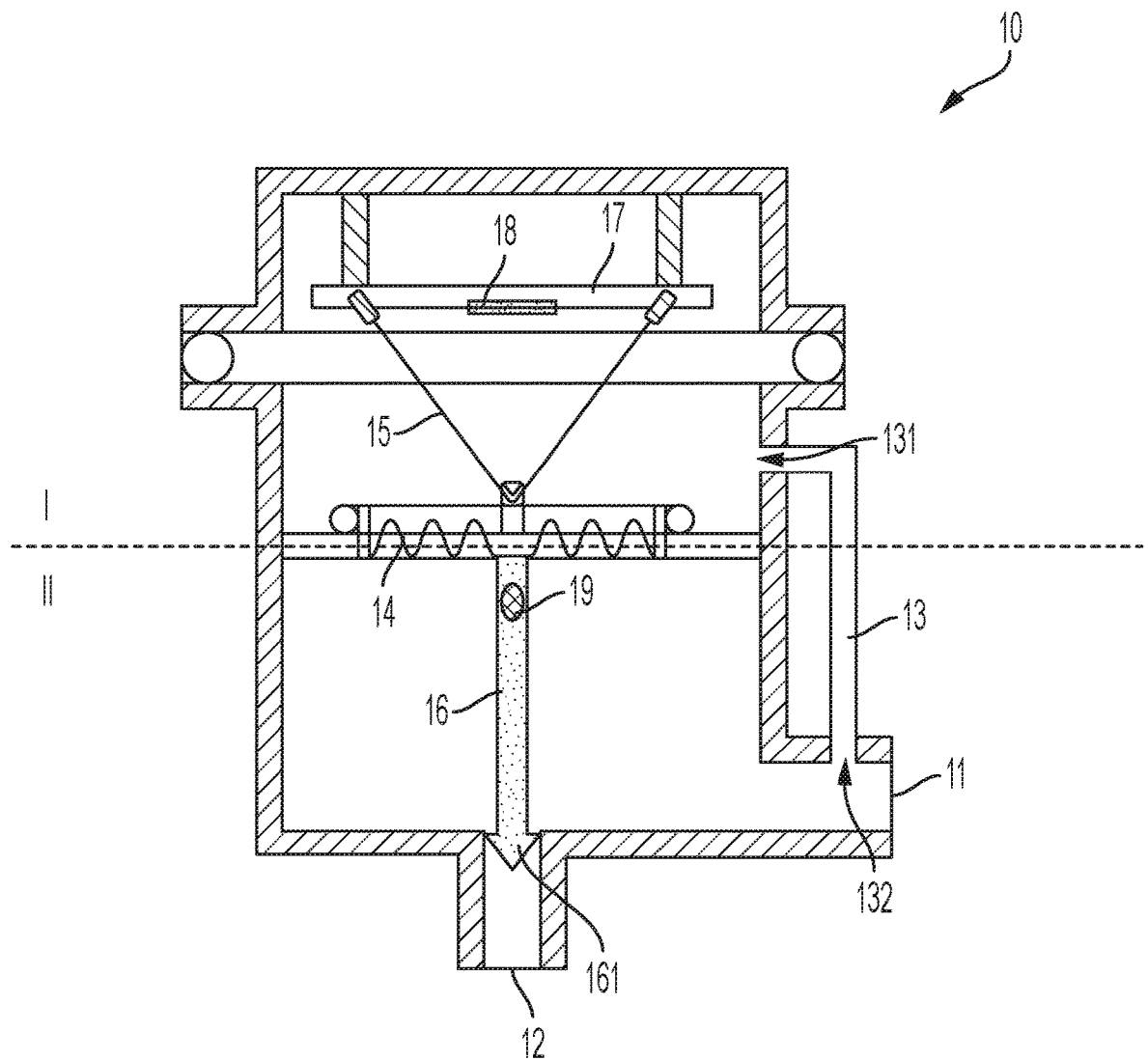

(51) Int. Cl.
  *F16K 31/00* (2006.01)
  *F16K 31/126* (2006.01)

(58) Field of Classification Search
  USPC ............... 251/335.1–335.3, 281–282, 11
  See application file for complete search history.

(56) References Cited

U.S. PATENT DOCUMENTS

| | | | |
|---|---|---|---|
| 4,068,820 A | 1/1978 | Pimentel | |
| 4,250,914 A * | 2/1981 | Ferrentino | G05D 7/0106 251/282 |
| 4,618,092 A * | 10/1986 | Fukushima | B60H 1/3211 251/282 |
| 5,325,880 A * | 7/1994 | Johnson | F16K 99/0038 60/528 |
| 5,345,963 A * | 9/1994 | Dietiker | F16K 31/025 137/12 |
| 6,374,608 B1 * | 4/2002 | Corris | F03G 7/065 60/527 |
| 6,824,116 B1 * | 11/2004 | Woo | F16K 31/402 251/129.17 |
| 9,664,182 B2 * | 5/2017 | Nicolini | F03G 7/065 |
| 9,958,081 B2 * | 5/2018 | Deperraz | F03G 7/065 |
| 2005/0184261 A1 * | 8/2005 | Stern | F16K 31/404 251/30.03 |
| 2012/0151913 A1 | 6/2012 | Foshansky | |
| 2019/0353269 A1 * | 11/2019 | Ossmer | F16K 99/0015 |
| 2020/0101883 A1 * | 4/2020 | Beuschel | F16K 11/044 |
| 2020/0103047 A1 * | 4/2020 | Beuschel | F16K 31/025 |

\* cited by examiner

BALANCED PRESSURE TWO-ZONE FLUIDIC VALVE WITH SHAPE MEMORY ALLOY CONTROL ELEMENT The present invention in a first aspect thereof is inherent to a fluidic valve with a shape memory alloy (SMA) control element.

Actuator assemblies and actuating systems employing shape memory alloy wires are known in the art since a long time and are becoming increasingly diffused due to recent developments improving their reliability and robustness that allow to fully exploit their intrinsic advantages, such as compactness, ease of integration. For example, the international patent application WO 2016/156283 in the Applicant's name relates to a lock having an emergency actuator, the European patent number 2615951 in the Applicant's name describes an actuating system for a valve installed in a multi-beverage vending machine, the European patent 2171183 in the Applicant's name describes an actuator having a broadened range of working temperatures, the international patent application WO 2015/150377 describes an actuating element in a household appliance.

In all these devices the features of a shape memory alloy (SMA) are exploited, more specifically, the SMA material property of being characterized by a structural transition between two phases, namely the so-called Martensite phase which is stable at a lower temperature, and the so-called Austenite phase, which is stable at a higher temperature. A shape memory alloy is characterized by four temperatures Mf, Ms, As, Af where Mf is the temperature below which the shape memory alloy is completely in the Martensite phase, i.e. it has a martensitic structure, while Af is the temperature above which the shape memory alloy is fully in the Austenite phase, i.e. it has an austenitic structure, and Ms, As are the temperatures at which the transition starts in the two directions.

Wires made of a shape memory alloy, also known as SMA wires, can be trained to change their shape when temperature changes from below Mf to above Af, and vice versa. Processing and training of SMA wires are widely known procedures in the field, as exemplified by the paper "Shape Memory Alloy Shape Training Tutorial" dating back to the Fall 2004 training section "ME559—Smart Materials and Structures".

It is also known that SMA wires start to shorten at a temperature equal to or higher than the Austenite start temperature As and reach their final length when heated at a temperature equal or above the Austenite final temperature Af. The shape memory alloy wire controlled shortening, usually by heating through current passage (Joule effect), is used to displace one or more element in the actuator.

One of the most interesting fields of use of SMA wires is valve porting control in fluidic valves, as exemplified in U.S. Pat. No. 4,068,820 showing a SMA wire acting on a diaphragm for moving an opening/closing stem. More recent fluidic valve developments are disclosed in EP 2239486 and in EP 3078890, both these documents addressing the pressure balance problem arising from valve port opening or switching by means of suitable fluid-tight isolation between the different valve zones. In particular, EP 2239486 discloses SMA wires located in a separate dry zone and used to toggle a piston between the open and closed position of the valve corresponding to the closure of a pilot hole in a diaphragm.

US patent application 2012/0151913 describes a fully isolated two-zone valve system with a membrane provided with a series of orifices to spread flow passage and decrease pressure unbalance. Furthermore, it similarly discloses the use of SMA wires in a separate dry zone for toggling a bistable spring between two positions respectively corresponding to the closed and open state of the valve, which therefore cannot operate in a proportional way.

As mentioned, one of the most challenging problems in SMA-actuated valves is the management of the pressure transition when the valve changes status, as this may lead to forces pulling or pushing (depending on valve port positioning) the valve plunger thus leading to uncontrolled output flow changes, especially in proportional valves.

Purpose of the present invention is to provide a different and improved solution to such technical problem, and in a first aspect thereof consists in a fluidic valve comprising a first zone and a second zone separated by an aperture sealed by a deformable element, wherein in the first zone there is a shape memory alloy wire secured to a stationary surface and acting on a first surface of the deformable element either directly or through a piston, and in the second zone there are at least two ports and a plunger, suitable to close one of said ports, that is connected to a second surface of the deformable element opposite to the first surface, a fluid bypass connecting the first and second zone.

Figure 2:
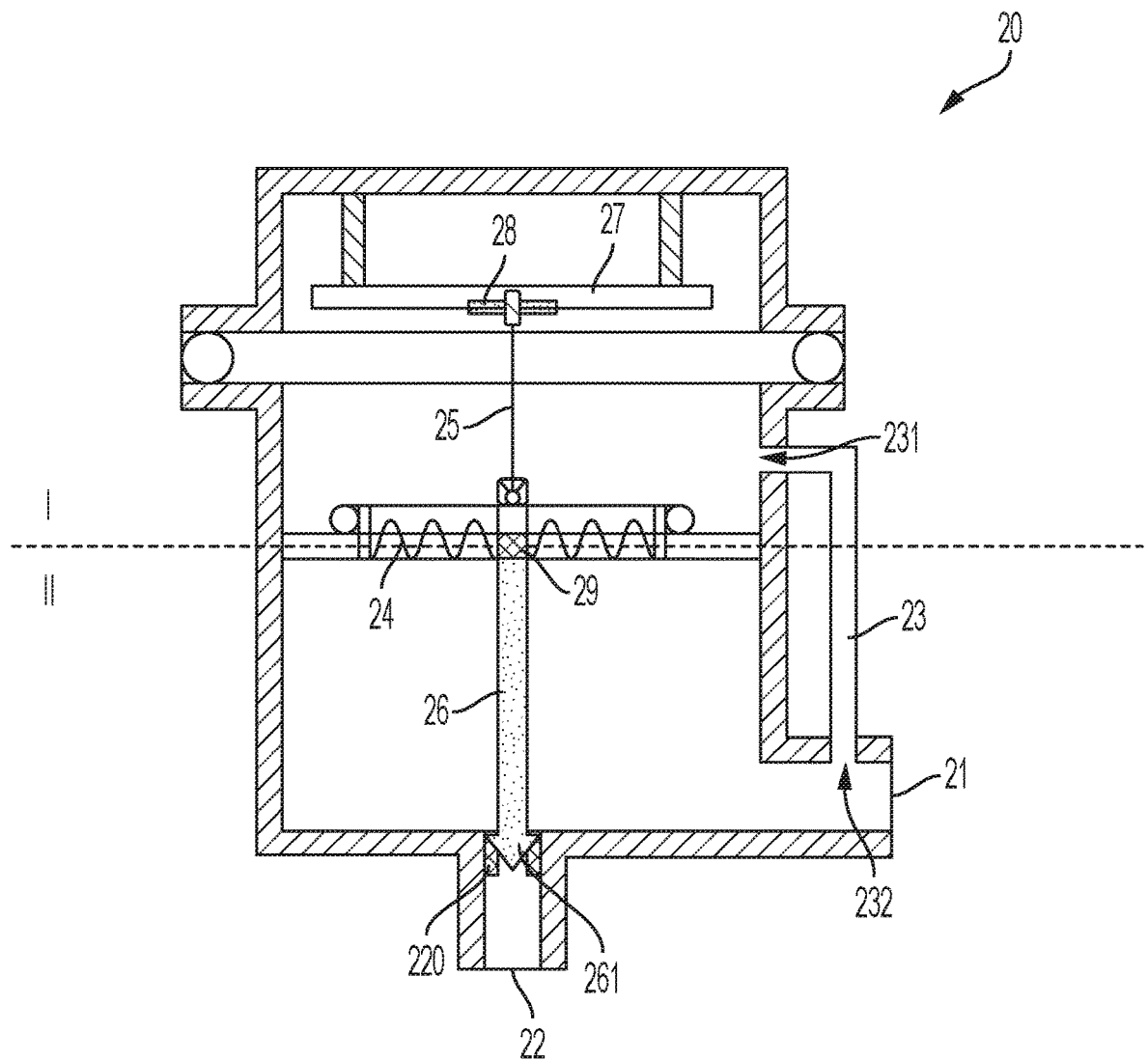
Figure 3:
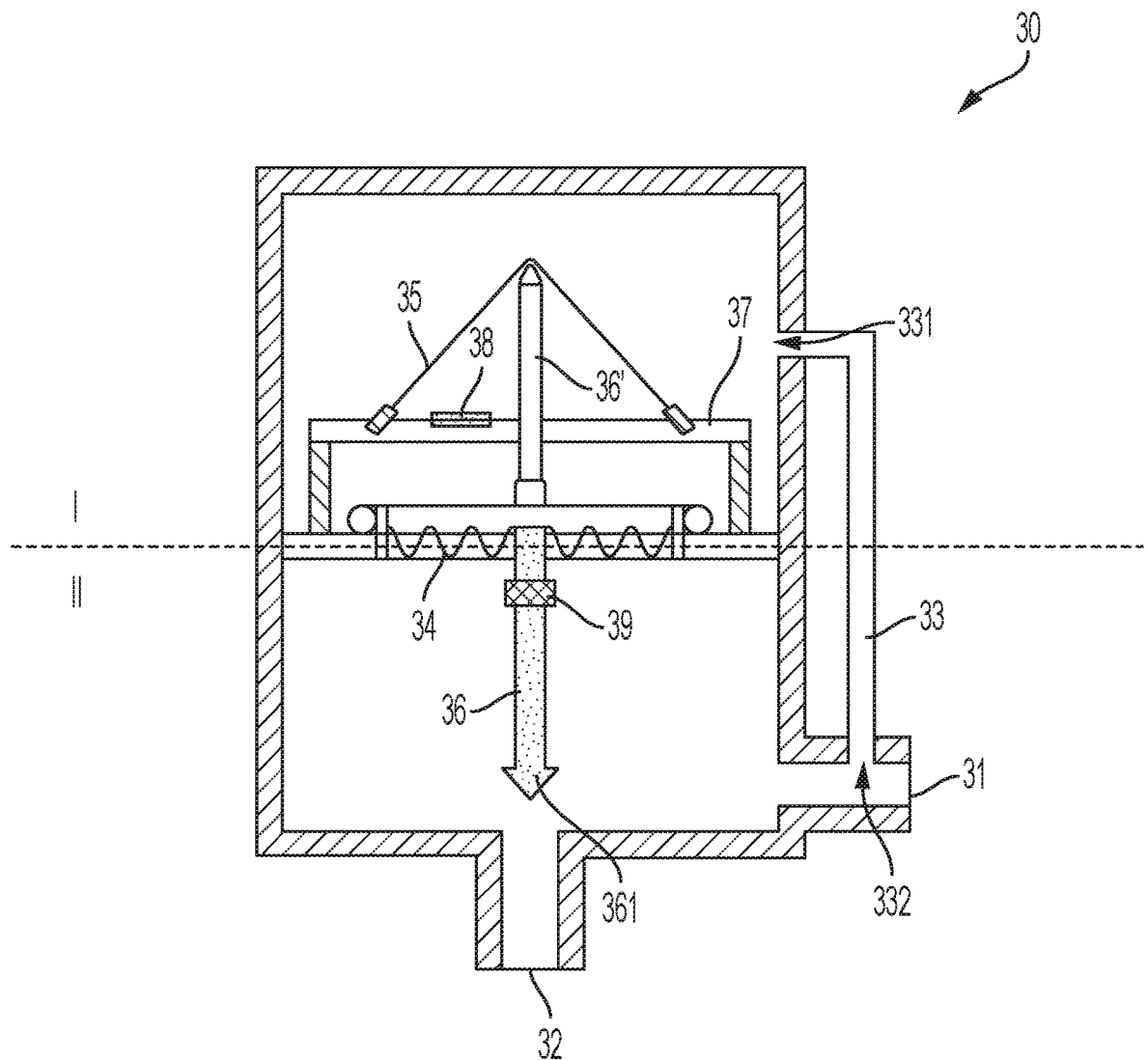
Figure 4:
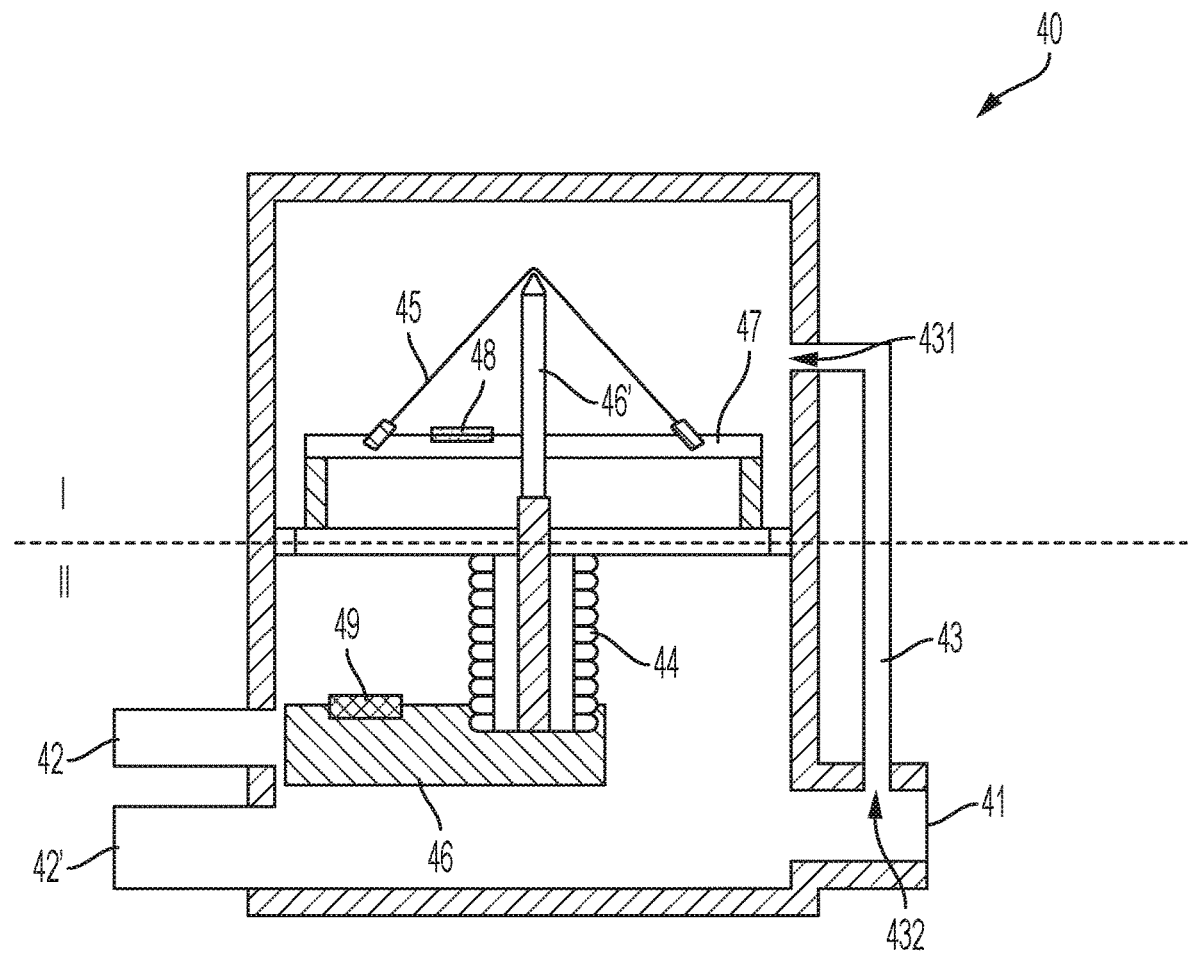

The invention will be further illustrated with the help of the following figures, where:

FIG. 1 shows a schematic cross-sectional view of a first embodiment of a fluidic valve according to the present invention, FIG. 2 shows a schematic cross-sectional view of a second embodiment of a fluidic valve according to the present invention, FIG. 3 shows a schematic cross-sectional view of a third embodiment of a fluidic valve according to the present invention, and FIG. 4 shows a schematic cross-sectional view of a fourth embodiment of a fluidic valve according to the present invention.

For clarity's sake, dimensions and dimensional ratios of the various parts shown in the drawings may have been altered, with particular and non-exclusive reference to the diameter of the shape memory alloy wires; moreover also some elements not essential for the understanding of present invention have not been represented in the schematic views, for example shape memory alloy wire crimpings, electrical contacts, etc.

A cross-sectional view of a valve 10 according to a first embodiment is shown in FIG. 1. Valve 10 has a valve case having two ports 11, 12 with the latter being closeable by the terminal part 161 of a plunger 16 connected to a deformable element 14 that drives it through its deformation. When plunger 16 is in contact with port 12 the valve is closed, when plunger 16 rises the valve is opened, initially partially and then fully once plunger 16 is totally moved away from port 12. The precise positioning of plunger 16 allows for proportional valve control.

The vertical positioning of plunger 16 is controlled by a shape memory alloy wire 15 connected between a stationary surface 17 and the deformable element 14 in a V shape configuration, i.e. its extremities are both fixed to the stationary surface 17 and its median portion is connected to the deformable element 14.

The position of the deformable element 14 defines two valve zones, namely a first one (I) above it comprising the stationary surface 17, the SMA wire 15 and the upper surface of the deformable element 14, and a second one (II) below it comprising the two valve ports 11, 12, plunger 16 and the lower surface of the deformable element 14. A preferred configuration for detecting the position of plunger 16 is by means of a magnet 19 affixed to plunger 16 and a Hall effect sensor 18 mounted on the stationary surface 17 (plunger position feedback is an aspect of paramount importance in proportional valve control).

To balance the pressure during the actuation of valve 10, a bypass channel 13 connects the two zones, bypass 13 having a first aperture 131 in the upper zone I and a second aperture 132 in the lower zone II. The presence of bypass 13 ensures that there is no differential pressure or more precisely that the pressure is quickly balanced between zone I and zone II.

If no bypass is present in the valve shown in FIG. 1, upon actuation of the SMA wire 15 plunger 16 rises opening port 12 and as a result there is a pressure change in zone II, that depending on the valve sizing and flow rate may be severe. For example, if port 12 is used as an outlet and the valve opening causes a pressure drop in zone II, this would result in an antagonistic force against the pull exerted by the SMA wire 15, with the drawback that it would be necessary to apply an increased power to the SMA wire 15 to keep plunger 16 raised in the desired position or, if constant power is applied, with a lowering of plunger 16 that could result in an unintended valve flow decrease, that in the most severe cases may even lead to unintentional valve closing.

It is important to remark that no shut-off element is present in bypass channel 13 or in correspondence of one of its apertures 131, 132, as this configuration allows for an automatic balance of the pressure differential between zones I and II.

FIG. 2 shows a schematic cross-sectional view of a second embodiment of a valve 20 according to the present invention, in which a SMA wire 25 is connected between a stationary surface 27 and a central point of the upper surface of a deformable element 24, that closes an aperture separating an upper zone I from a lower zone II.

In this embodiment a magnet 29 is mounted on the deformable element 24 so as to provide, through a Hall effect sensor 28 mounted on the stationary surface 27, an appropriate feedback on the position of a plunger 26 secured to the lower surface of the deformable element 24, which is an important feature in proportional valves.

FIG. 2 shows a normally closed valve, i.e. the SMA wire 25 is unactuated and the terminal part 261 of plunger 26 seals a valve port 22, preferably with the use of a ring gasket 220, thus preventing a fluid flow between the two ports 21, 22. It is to be underlined that such gasket 220 is optional and could be absent in case of a "perfect" dimensional matching between port 22 and terminal 261, such as, for example in the embodiment of FIG. 1. In some cases, element 220 may be an element also absolving a flow control function, such as a calibrated orifice. Bypass channel 23, with a first aperture 231 in the first valve zone and a second aperture 232 in the second valve zone, ensures the pressure balancing upon actuation of valve 20.

FIG. 3 shows a schematic cross-sectional view of a third embodiment of a valve 30 according to the present invention that is very similar to the first embodiment except for the way in which the SMA wire acts on the deformable element such that this is a normally opened valve. In fact, while the SMA wire 35 still has a V shape configuration, with its extremities connected to a stationary surface 37, its median portion contacts a first end of a piston 36' extending through the stationary surface 37 substantially perpendicularly to the upper surface of the deformable element 34, with the second end of piston 36' connected thereto and its first end located on the opposite side of the stationary surface 37 with respect to the deformable element 34 (i.e. upwards in FIG. 3).

Actuation (and therefore shortening) of the SMA wire 35 causes the deformation of the deformable element 34 through the lowering of piston 36', causing the lowering of plunger 36 to close, with its terminal portion 361, port 32 so as to close valve 30 at the end of its run.

As in the first two embodiments, a bypass channel 33 with two end apertures 331, 332 puts into communication valve zone II, containing plunger 36 and the valve ports 31 and 32, with the valve zone I, containing the SMA wire 35 and piston 36'. Also, a Hall effect sensor 38 and a magnet 39 allow for plunger position feedback and therefore valve proportional control.

FIG. 4 shows a schematic cross-sectional view of a fourth embodiment of a valve 40 according to the present invention that differs from valve 30 of the third embodiment in that it has three ports 41, 42, 42' formed on opposite sides of the valve housing and in that it comprises a bellows 44 as deformable element that divides the valve in the two zones I, II. Differently from membranes (deformable elements of FIGS. 1-3) that under traction or pulling change their curvatures, bellows 44 under traction or pulling extends vertically within zone II.

As in the third embodiment, a V-shaped SMA wire 45 mounted on a stationary surface 47 engages the top of a piston 46' extending through the stationary surface 47 substantially perpendicularly to the upper surface of the deformable element 44, with the bottom of piston 46' connected thereto and its top located on the opposite side of the stationary surface 47 with respect to the deformable element 44. It should be noted that in this case the upper and lower surface of the deformable element are considered to be those of the base of bellows 44, so as to conceptually maintain the horizontal arrangement of the deformable element.

On the lower surface of bellows 44 there is fixed a plunger 46 that extends horizontally so as to close a valve port formed in a lateral wall of the valve. In the depicted embodiment, the vertical positioning of plunger 46 selectively and alternately puts into communication one of valve ports 42, 42' with port 41, whereby valve 40 is an example of a three-way valve.

The vertical position of plunger 46 is determined by the actuated or unactuated state of the SMA wire 45, the advantage of the use of a bellows is that by its own structure it provides the return/biasing force in a spring-like fashion once the SMA wire 45 is de-actuated (not heated).

Bypass 43 with its apertures 431 and 432 ensures the pressure balancing between zone I and II upon actuation of the SMA wire 45 and therefore switching between valve ports 42 and 42'. Also in this case, a Hall effect sensor 48 mounted on the stationary surface 47 and a magnet 49 mounted on terminal 461 allow a feedback on the position of plunger 46 for proportional control, this configuration being particularly useful in the case of mixer valves.

Valves according to the present invention can be implemented with various variants, some of which have already been shown with reference of the described figures, in particular:

SMA wire configurations: among the most useful configurations a single SMA wire is used, preferably in a straight form, with one of its extremities fixed to the stationary surface and the other one to the deformable element, or alternately in the so-called V/U shape configurations, with both wire extremities fixed to the stationary surface and a median portion fixed/connected to the deformable element;

valve types: the valve itself may be a simple on/off valve or a proportional valve;

valve ports: the valve may be a simple 2-way valve, with two valve ports that correspond to inlet and outlet (FIGS. 1-3), or it may have a more complex configuration with three ports to form a 3-way valve (FIG. 4) or even more ports (4-way, . . . );

deformable element: the invention is not limited to a specific type of deformable element, even though preferred ones are bellows and membranes, particularly corrugated membranes;

material of the deformable element: preferred materials are flexible metals, even though also plastic or silicone may be used;

position feedback: although the use of a Hall effect sensor and a magnet is preferred, other means can be employed for example the SMA resistance control;

piston and plunger: in some cases these two elements may be incorporated into a single one and in the case of membranes the middle portion of this common element is restrained to the deformable element to alter its curvature;

bypass channel: the preferable ratio between the cross-sectional area of the bypass channel and the cross-sectional area of the valve ports is comprised between 0.1 and 1, this ensures the best bypass balancing flow rate with respect to the overall valve flow rate.

Examples of suitable shape memory alloys to be used in the fluidic valves according to the present invention are Ni—Ti based alloys such as Nitinol, with or without additional elements chosen among Hf, Nb, Pt, Cu. Most usefully, the diameter of the SMA wires is comprised between 25 µm and 500 µm.

It should be noted that the description of the embodiments illustrated above makes specific reference to the exemplary drawings used to explain their structure and operation, but it is clear that the valve could be made to operate with any orientation, i.e. it could be rotated through 360°. As a consequence, all the relative terms as "upper", "lower", "upwards", "lowering", etc. could be replaced by the relevant terms depending on the actual orientation of the valve.

In a second aspect thereof the invention is inherent to the use of a valve as described above for controlling a fluid flow by means of a shape memory alloy wire.

Although the valves of the present invention are applicable to the control of any suitable flow, they are mostly advantageous when applied to fluids such as water, oil or refrigerant fluid (for example the so-called R410a) or more in general with all fluids that can change their own state in evaporation/condensation valves, since the evaporation/condensation zone is limited to zone II while the SMA wire is resident in zone I.

The invention claimed is:

1. A fluidic valve comprising a first zone (I) and a second zone (II) separated by an aperture sealed by a deformable element,
    wherein in said first zone (I) there is a shape memory alloy wire secured to a stationary surface and acting on a first surface of said deformable element either directly or through a piston,
    wherein in said second zone (II) there are at least two ports, including an inlet port and an outlet port, and a plunger connected to a second surface of the deformable element, opposite to said first surface, and configured to close and seal the outlet port,
    wherein a bypass channel permanently connects the first zone (I) to the second zone (II) through a first end aperture positioned in the first zone (I) and a second end aperture positioned in the inlet port in the second zone (II), and
    wherein said fluidic valve further comprises a valve case defining, with said aperture and said deformable element, said first zone (I) and said second zone (II), and wherein said stationary surface is not a surface of said valve case and not a surface of said deformable element.

2. The fluidic valve according to claim 1, wherein the shape memory alloy wire is arranged in a V-shaped configuration such that a median portion of the shape memory alloy wire engages a first end of the piston, wherein the piston extends through the stationary surface substantially perpendicularly to the first surface of the deformable element, with the second end of the piston connected thereto and the first end of the piston being located on the opposite side of the stationary surface with respect to the deformable element.

3. The fluidic valve according to claim 1, wherein the deformable element is selected from bellows and membranes.

4. The fluidic valve according to claim 3, wherein the deformable element is a bellow.

5. The fluidic valve according to claim 3, wherein the deformable element is a membrane.

6. The fluidic valve according to claim 3, wherein the deformable element is a corrugated membrane.

7. The fluidic valve according to claim 1, wherein the deformable element is made of metal.

8. The fluidic valve according to claim 1, wherein a ratio between a cross-sectional area of the bypass channel and a cross-sectional area of the inlet and outlet ports is comprised between 0.1 and 1.

9. The fluidic valve according to claim 1, wherein a diameter of the shape memory alloy wire is comprised between 25 µm and 500µm.

10. The fluidic valve according to claim 1, wherein the shape memory alloy wire is directly connected to the first surface of the deformable element at a median portion of the shape memory alloy wire in a V-shaped configuration.

11. The fluidic valve according to claim 1, wherein the shape memory alloy wire is directly connected to the first surface of the deformable element at an extremity of the shape memory alloy wire.

12. The fluidic valve according to claim 1, wherein the shape memory alloy wire is formed of a Ni-Ti alloy.

* * * * *